United States Patent
Shen et al.

(10) Patent No.: US 11,662,068 B2
(45) Date of Patent: May 30, 2023

(54) HAND-HELD SPOTLIGHT

(71) Applicant: NINGBO TALLER ELECTRICAL APPLIANCE CO., LTD., Yuyao (CN)

(72) Inventors: Jianli Shen, Yuyao (CN); Xiang Zhang, Yuyao (CN)

(73) Assignee: NINGBO TALLER ELECTRICAL APPLIANCE CO., LTD., Yuyao (CN)

( * ) Notice: Subject to any disclaimer, the term of this patent is extended or adjusted under 35 U.S.C. 154(b) by 0 days.

(21) Appl. No.: 17/451,439

(22) Filed: Oct. 19, 2021

(65) Prior Publication Data
US 2022/0403988 A1 Dec. 22, 2022

(30) Foreign Application Priority Data
Jun. 16, 2021 (CN) .......................... 202121343821.7

(51) Int. Cl.
*F21L 4/08* (2006.01)
*F21V 23/02* (2006.01)
(Continued)

(52) U.S. Cl.
CPC .............. *F21L 4/08* (2013.01); *F21V 21/145* (2013.01); *F21V 21/30* (2013.01); *F21V 21/406* (2013.01); *F21V 23/023* (2013.01); *F21V 23/0414* (2013.01); *F21L 4/085* (2013.01); *F21V 23/003* (2013.01); *F21V 23/004* (2013.01); *F21V 23/005* (2013.01); *F21V 23/006* (2013.01);
(Continued)

(58) Field of Classification Search
CPC ........... F21L 4/08; F21L 4/085; F21V 21/406; F21V 23/003; F21V 23/004; F21V 23/005; F21V 23/006; F21V 23/007; F21V 23/008; F21V 23/009; F21V 23/02; F21V 23/023; F21V 23/026; F21V 23/0414; F21V 23/0428; H01M 50/103; H01M 50/20; H01M 50/247
See application file for complete search history.

(56) References Cited

U.S. PATENT DOCUMENTS

| 11,162,649 B1* | 11/2021 | Sharrah | F21V 21/406 |
| 2002/0158605 A1* | 10/2002 | Sharrah | F21L 4/08 |
| | | | 320/115 |
| 2005/0024861 A1* | 2/2005 | Sze-Tai | F21L 4/02 |
| | | | 362/205 |

(Continued)

FOREIGN PATENT DOCUMENTS

| CN | 2566099 | 8/2003 |
| CN | 201166274 | 12/2008 |

(Continued)

*Primary Examiner* — Colin J Cattanach
(74) *Attorney, Agent, or Firm* — Innovation Capital Law Group, LLP; Vic Lin

(57) ABSTRACT

A hand-held spotlight, having: a housing provided with an accommodating cavity; a power supply box detachably disposed in the accommodating cavity; a switch base connected to the housing and provided with a first clamping block; and a cover body hinged with the housing, wherein the cover body is capable of covering an opening of the accommodating cavity to confine the power supply box within the accommodating cavity, and the cover body is provided with a second clamping block, which is clamped with the first clamping block when the cover body covers the opening of the accommodating cavity, thereby restricting the flipping of the cover body.

11 Claims, 8 Drawing Sheets

(51) Int. Cl.
  *F21V 21/30*    (2006.01)
  *F21V 21/40*    (2006.01)
  *F21V 21/14*    (2006.01)
  *F21V 23/04*    (2006.01)
  *F21V 23/00*    (2015.01)
  *H01M 50/103*   (2021.01)
  *H01M 50/247*   (2021.01)
  *H01M 50/20*    (2021.01)

(52) U.S. Cl.
  CPC ......... *F21V 23/007* (2013.01); *F21V 23/008* (2013.01); *F21V 23/009* (2013.01); *F21V 23/02* (2013.01); *F21V 23/026* (2013.01); *F21V 23/0428* (2013.01); *H01M 50/103* (2021.01); *H01M 50/20* (2021.01); *H01M 50/247* (2021.01)

(56) References Cited

U.S. PATENT DOCUMENTS

| | | | |
|---|---|---|---|
| 2006/0077670 A1* | 4/2006 | Yuen | F21V 21/26 362/372 |
| 2006/0087846 A1* | 4/2006 | Yuen | F21V 21/406 362/261 |
| 2006/0098437 A1* | 5/2006 | Yuen | F21V 21/06 362/399 |
| 2006/0139927 A1* | 6/2006 | Kovacik | F21V 21/08 362/183 |
| 2007/0171082 A1* | 7/2007 | Melnik | F21L 4/005 340/574 |
| 2016/0010837 A1* | 1/2016 | Jigamian | F41G 1/35 411/116 |
| 2016/0153626 A1* | 6/2016 | Ozaka | H02J 7/342 362/183 |
| 2017/0138575 A1* | 5/2017 | Harvey | F21L 4/027 |
| 2020/0044478 A1* | 2/2020 | Tally | H01M 10/425 |
| 2021/0140614 A1* | 5/2021 | Miwa | F21V 21/06 |
| 2021/0356104 A1* | 11/2021 | Thorne | F21V 23/06 |

FOREIGN PATENT DOCUMENTS

| | | | |
|---|---|---|---|
| CN | 107461629 A | * 12/2017 | |
| DE | 102015222433 A1 | * 5/2017 | |
| GB | 2442245 A | * 4/2008 | F21L 4/027 |

* cited by examiner

HAND-HELD SPOTLIGHT

BACKGROUND OF THE INVENTION

1. Technical Field

The present invention belongs to the technical field of lighting tools, and relates to a hand-held spotlight.

2. Description of Related Art

A spotlight has the characteristics of strong light condensing, long light range and the like, and thus is generally applied to night patrol, emergency automobile inspection and the like.

An existing hand-held rechargeable spotlight includes a housing, a lifting handle disposed on the housing, a switch, and a charging port, wherein one end of the housing is provided with a light source and a reflecting hood; and the housing is internally further provided with a power supply and a charging circuit. The spotlight in such a structure has advantages such as compact structure and convenience in use.

For example, Chinese Patent Application No. 200820083449.9 (Pub. No. CN201166274Y) provides a hand-held rechargeable spotlight, including a housing, wherein the housing is provided with a lifting handle, a switch, and a charging port; one end of the housing is provided with a light source and a reflecting hood; the housing is internally further provided with a power supply and a charging circuit; the power supply is electrically connected to the switch, the power supply, and the charging circuit, respectively; a charging socket is disposed within the charging port; the charging circuit is electrically connected to the charging socket; and the charging port is provided with a movable cover piece.

In summary, although the movable cover piece is disposed on the charging port of the housing in some of the existing technical solutions, the power supply is fixedly mounted on the housing, which still results in problems such as inconvenience in mounting and inapplicability to a mobile power pack. There is much room for improvement.

BRIEF SUMMARY OF THE INVENTION

In view of the aforesaid problems existing in the prior art, an object of the present invention is to provide a hand-held spotlight.

The object of the present invention can be achieved through the following technical solutions a hand-held spotlight includes:

a housing provided with an accommodating cavity; a power supply box detachably disposed in the accommodating cavity; a switch base connected to the housing and provided with a first clamping block; and a cover body hinged with the housing, wherein the cover body is capable of covering an opening of the accommodating cavity to confine the power supply box within the accommodating cavity, and the cover body is provided with a second clamping block, which is clamped with the first clamping block when the cover body covers the opening of the accommodating cavity, thereby restricting the flipping of the cover body.

Preferably, the housing includes a mounting base and a light-holder base connected to the mounting base; the power supply box is located in the accommodating cavity; the power supply box is provided with a first output contact; the light-holder base is provided with a lighting element; the mounting base is provided with a receiving contact, which is electrically connected to the lighting element; and the first output contact is electrically connected to the receiving contact to allow the power supply box to supply power to the lighting element.

Preferably, the mounting base is provided with a mounting cavity; the accommodating cavity is located in the mounting base; the switch base is movably disposed in the mounting cavity; and the switch base when pressed is capable of separating the first clamping block from the second clamping block.

Preferably, the mounting cavity is internally provided with a reset spring, both ends of which are respectively in abutment with the switch base and the mounting base.

Preferably, the switch base is further provided with a limiting section, which is in abutment with an opening of the mounting cavity to confine the switch base within the mounting cavity.

Preferably, the mounting base is provided with a butting column, which is in abutment with the power supply box when the cover body covers the opening of the accommodating cavity, thereby electrically connecting the first output contact to the receiving contact.

Preferably, the mounting base is further provided with a circuit board, which is electrically connected to the light-holder base; and the circuit board is capable of controlling the power supply of the power supply box.

Preferably, the hand-held spotlight further includes a handle, which is connected to the mounting base, wherein the handle is provided with a trigger button which is connected to the circuit board.

Preferably, the light-holder base has a D-shaped light-holder structure.

Preferably, a side wall of the mounting base is provided with a side hole, which is connected to the accommodating cavity; and the power supply box is further provided with a second output contact and an input contact, both of which are located in the side hole.

Preferably, the power supply box is further provided with a detachable cover piece, which covers the second output contact and the input contact.

Preferably, the cover piece is provided with a connecting cord, which has one end elastically connected to the cover piece and the other end inserted into the power supply box.

Preferably, the power supply box is further provided with a power switch, which is located in the side hole.

Preferably, the power supply box is further provided with a display screen for displaying the remaining capacity of the power supply box, and the display screen is located in the side hole.

Preferably, the mounting base is hinged with a lifting handle.

Compared with the prior art, the present invention has the following advantageous effects.

1. The power supply box is detachably disposed in the accommodating cavity, and the switch base and the cover body are respectively provided with the first clamping block and the second clamping block, such that a user only needs to cover with the cover body to automatically clamp the first and second clamping blocks, thereby confining the power supply box within the accommodating cavity. Therefore, the power supply box can be detached and mounted conveniently.

2. The switch base is movably disposed in the mounting cavity to conveniently fulfill an unlocking function, and the first and second clamping blocks can be separated simply by vertically pressing the switch base, such that the cover body can be separated from the mounting base. Therefore, the cover body can be opened conveniently to take out the power supply box.

3. The return spring is disposed between the switch base and a bottom surface of the mounting cavity; both ends of the return spring are respectively in abutment with the switch base and the bottom surface of the mounting cavity; and when the switch base is pressed, the return spring is stressed and compressed, and after an unlocking key is released, the return spring elongates to push the switch base to return.

4. Covering with the cover body not only can limit the movement of the power supply box, but also can electrically connect the first output contact to the receiving contact by abutment of butting column and the power supply box. Therefore, the power can be switched on without manually pressing the power supply box, thereby achieving convenience in use.

5. The second output contact is a USB interface and is disposed to supply power to an external electric device. Therefore, the power supply box can supply power to both the lighting element via the first output contact and to the external electric device via the second output contact.

6. The second output contact and the input contact are exposed to the outside and prone to getting rusty due to moisture. The cover piece is disposed to effectively protect the second output contact and the input contact against dust and moisture, and prevent the power supply box from failures caused by the faults of the second output contact and the input contact after long-term storage.

7. The lifting handle is disposed to facilitate a user. The hand-held spotlight when in use can be lifted with a hand in the case that a user is not available for holding the spotlight or the handle is damaged. Therefore, the hand-held spotlight is more universal.

Figure 1:
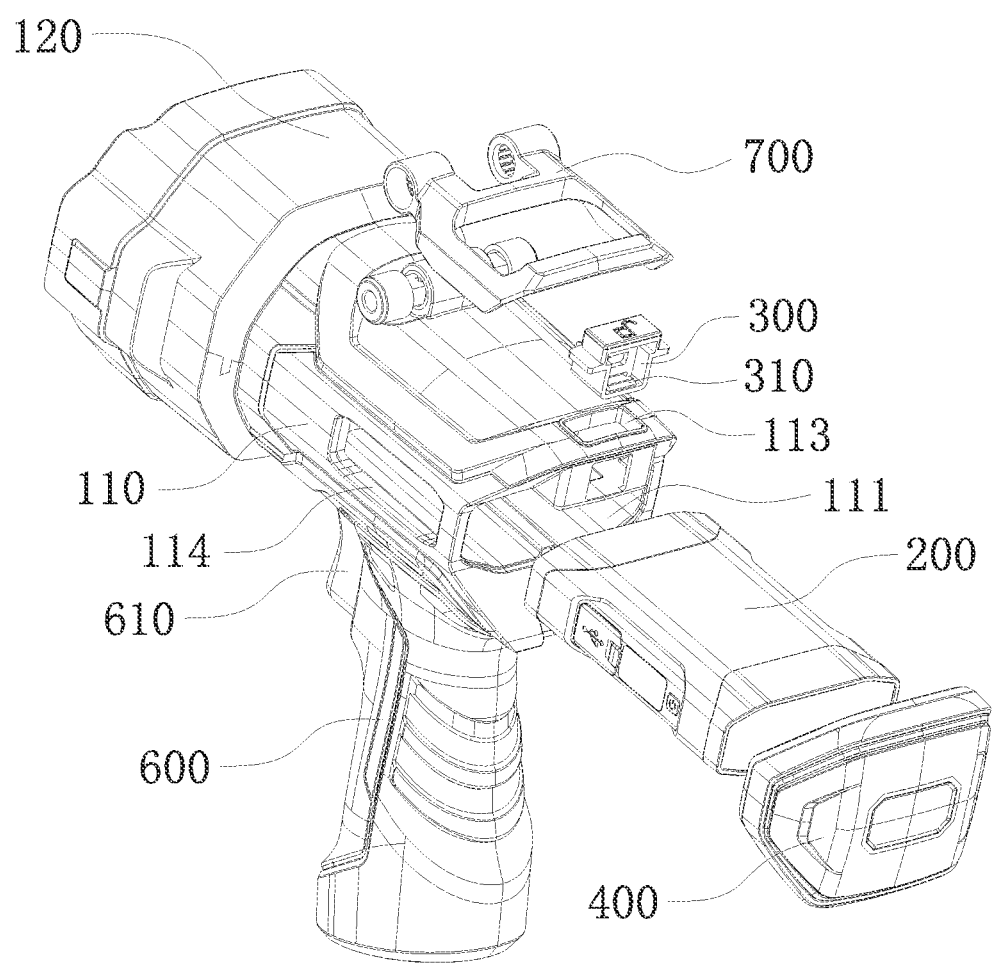
FIG. 1 is an exploded view of a hand-held spotlight according to the present invention.

In the figures, references signs are as follows: 110—mounting base; 111—accommodating cavity; 112—receiving contact; 113—mounting cavity; 114—side hole; 120—light-holder base; 121—light element; 200—power supply box; 210—first output contact; 220—second output contact; 230—input contact; 240—cover piece; 241—connecting cord; 250—power switch; 260—display screen; 300—switch base; 310—first clamping block; 320—limiting section; 400—cover body; 410—second clamping block; 420—butting column; 500—circuit board; 600—handle; 610—trigger button; and 700—lifting handle.

DETAILED DESCRIPTION OF THE INVENTION

The following are the specific embodiments of the present invention, and the technical solutions of the present invention will be further described below in conjunction with the accompanying drawings. However, the present invention is not limited to these embodiments.

It should be noted that all directional indications (such as, up, down, left, right, front, back, . . . ) in the embodiments of the present invention only serve to explain a relative positional relationship, a motion condition and the like between various components under a specific posture (as shown in the accompanying drawings). If the specific posture changes, the directional indications change therewith accordingly.

In addition, the descriptions such as "first", "second" and "one" involved in the embodiments of the invention are merely for a descriptive purpose, and shall not be construed as indicating or implying their relative importance or implicitly indicating the number of technical features indicated. As such, features defined by "first" and "second" can explicitly or implicitly include at least one of said features. In the description of the present invention, unless otherwise clearly specified, "a plurality of" means at least two, for example, two, three, etc.

In the present invention, unless otherwise expressly specified and defined, the terms "connection", "fixation", and the like should be understood in a broad sense. For example, the "fixation" may be a fixed connection, or a detachable connection or an integral connection; may be a mechanical connection or an electrical connection; may be a direct connection, or an indirect connection via an intermediate medium, or an internal connection between two elements, or an interaction relationship between two elements. For those of ordinary skills in the art, the specific meanings of the above terms in the present invention can be understood in accordance with specific conditions.

In addition, the technical solutions of various embodiments of the present invention can be combined with each other, which must be based on the fact that it is implementable for those skilled in the art. When the technical solutions are in conflict during the combining or the combination is not achievable, it should be considered that such a combination does not exist and is not within the protection scope claimed by the present invention.

As shown in FIGS. 1 to 8, a hand-held spotlight includes:

a housing provided with an accommodating cavity 111 for the mounting of a power supply box 200;

the power supply box 200 having a cuboid structure and detachably disposed in the accommodating cavity 111, which may be shaped to match the power supply box 200 in order to better fix the power supply box 200;

a switch base 300 connected to the housing and provided with a first clamping block 310, which is in effect a small lug; and a cover body 400 hinged with the housing, where the cover body 400 is capable of covering an opening of the accommodating cavity 111 to confine the power supply box 200 within the accommodating cavity 111, and the cover body 400 is provided with a second clamping block 410, which is clamped with the first clamping block 310 when the cover body 400 covers the opening of the accommodating cavity 111, thereby restricting the flipping of the cover body 400.

It should be particularly noted that a power supply in a previous method is fixedly disposed in a housing to supply power, in such a way that the power supply cannot be mounted conveniently; a mobile power pack is used in some of other existing technologies, in which however the mobile power pack is simply connected to a lamp without disposing the mobile power pack in the housing, resulting in a less compact structure and inconvenience in use.

In this embodiment, the power supply box 200 is detachably disposed in the accommodating cavity 111, and the switch base 300 and the cover body 400 are respectively provided with the first clamping block 310 and the second clamping block 410, such that a user only needs to cover with the cover body 400 to automatically clamp the first clamping blocks 310 and the second clamping blocks 410, thereby confining the power supply box 200 within the accommodating cavity 111. Therefore, the power supply box 200 can be detached and mounted conveniently.

Figure 2:
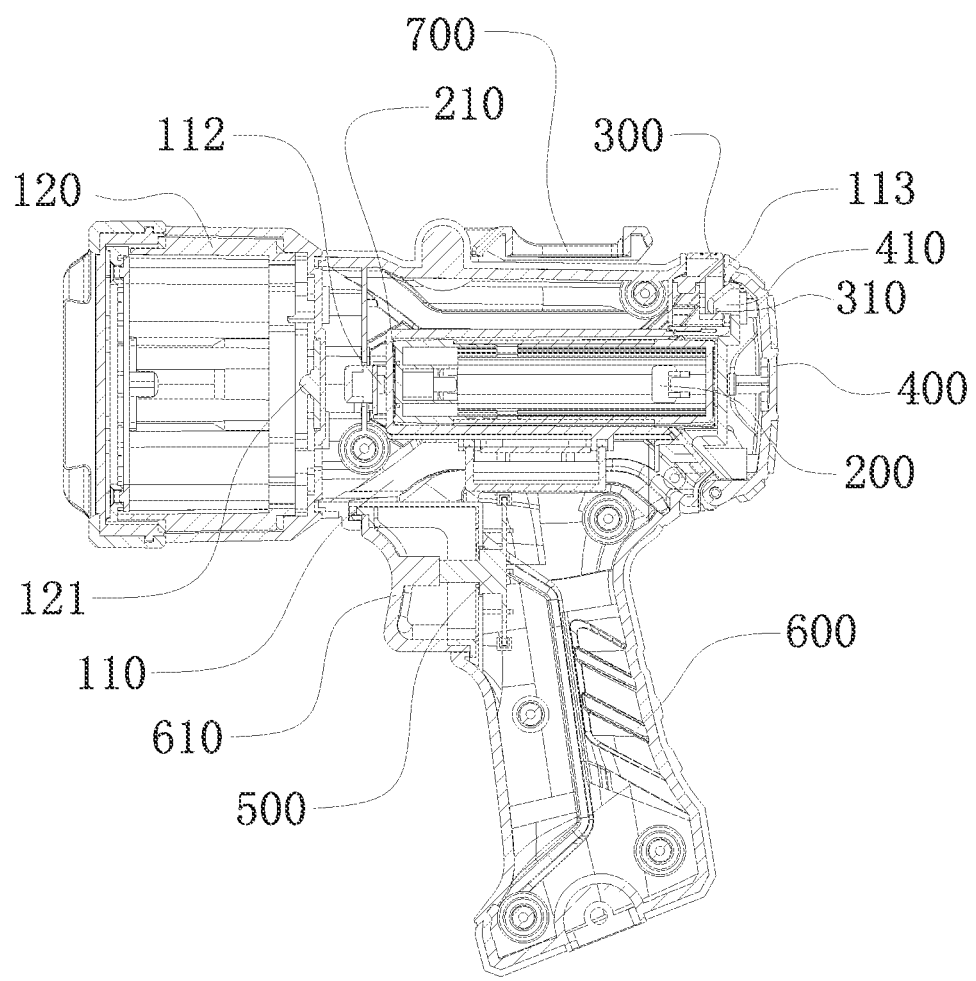
FIG. 2 is a schematic diagram of an internal structure of a hand-held spotlight according to the present invention.
Figure 3:
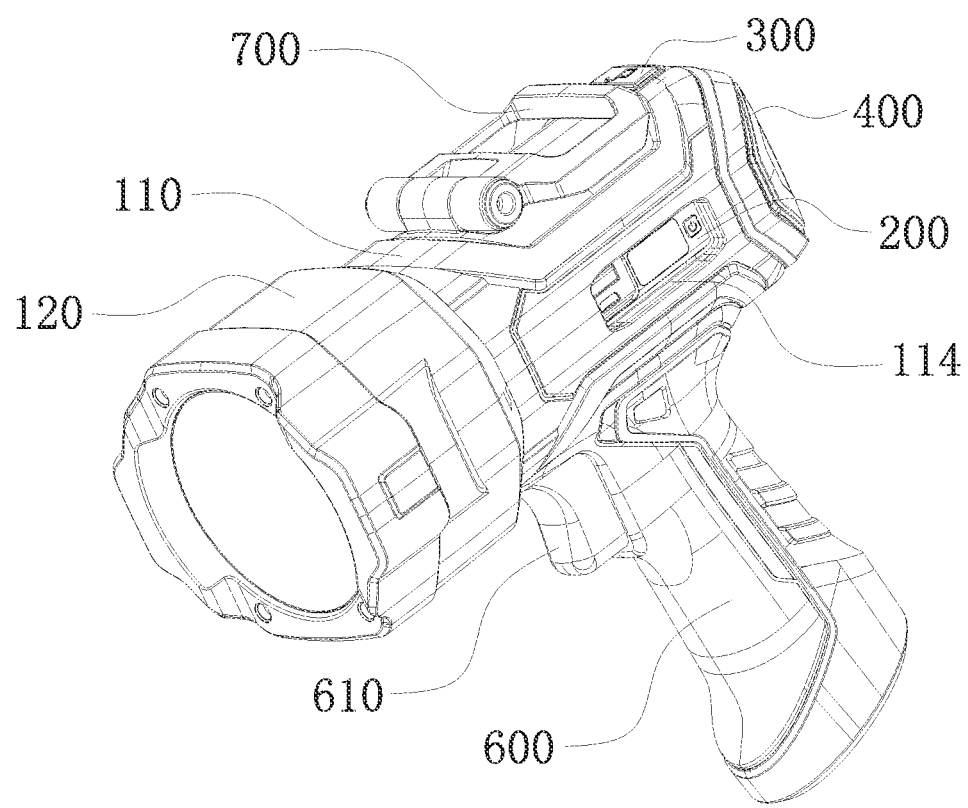
FIG. 3 is a schematic structural diagram of a hand-held spotlight according to the present invention.

As shown in FIGS. 1, 2, and 3, based on the embodiment described above, the housing includes a mounting base 110 and a light-holder base 120 connected to the mounting base 110; the accommodating cavity 111 is located in the mounting base 110; the power supply box 200 is provided with a first output contact 210; the light-holder base 120 is provided with a lighting element 121; the accommodating cavity 111 is provided with a receiving contact 112, which is electrically connected to the lighting element 121; and the first output contact 210 is electrically connected to the receiving contact 112 to allow the power supply box 200 to supply power to the lighting element 121.

In this embodiment, the mounting base 110 is constructed for the mounting of the power supply box 200 and the light-holder base 120 is constructed for the mounting of a lighting assembly, which is in effect just like a flashlight powered by a dry battery; and the receiving contact 112 is located on the side wall of the accommodating cavity 111, hence, the power supply box 200 is inserted to electrically connect the first output contact 210 to the receiving contact 112, thereby allowing the power supply box 200 to supply power to the lighting element 121.

Figure 5:
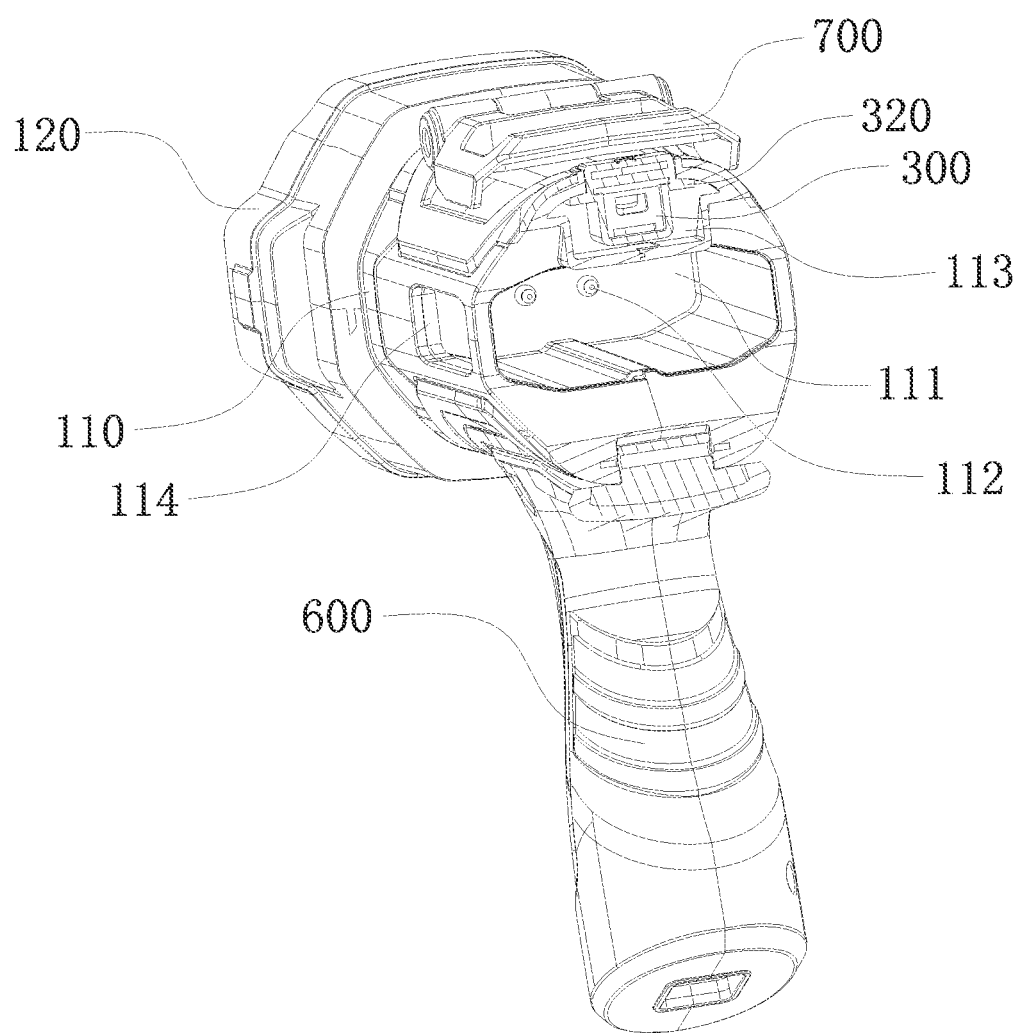
FIG. 5 is a schematic structural diagram of a switch base and a mounting cavity according to the present invention.

As shown in FIGS. 1, 2, and 5, based on the embodiments described above, the mounting base 110 is provided with a mounting cavity 113; the switch base 300 is movably disposed in the mounting cavity 113; and the switch base 300 when pressed is capable of separating the first clamping block 310 from the second clamping block 410.

Specifically, the mounting cavity 113 is close to a tail end of the mounting base 110, and the mounting cavity 113 is constructed for the mounting of the switch base 300, which is vertically movable in the mounting cavity 113.

In this embodiment, the switch base 300 is movably disposed in the mounting cavity 113 to conveniently fulfill an unlocking function, and the first clamping blocks 310 and the second clamping blocks 410 can be separated simply by vertically pressing the switch base 300, such that the cover body 400 can be separated from the mounting base 110. Therefore, the cover body 400 can be opened conveniently to take out the power supply box 200.

Further, a torsional spring can be further sleeved at a place where the cover body 400 is hinged with the mounting base 110; both ends of the torsional spring are in abutment with the cover body 400 and the mounting base 110 respectively; the torsional spring is compressed when the cover body 400 is covered; and after the switch base 300 is pressed, the cover body 400 may be bounced off due the elasticity of the torsional spring, such that a user can open the cover body 400 more conveniently.

As shown in FIGS. 1, 2, and 5, based on the embodiments described above, the mounting cavity 113 is internally provided with a return spring (not depicted in the figures), and both ends of the return spring are in abutment with the switch base 300 and the mounting base 110 respectively.

In this embodiment, the return spring is disposed between the switch base 300 and a bottom surface of the mounting cavity 113; both ends of the return spring are respectively in abutment with the switch base 300 and the bottom surface of the mounting cavity 113; and when the switch base 300 is pressed, the return spring is stressed and compressed, and after an unlocking key is released, the return spring elongates to push the switch base 300 to return.

Figure 7:
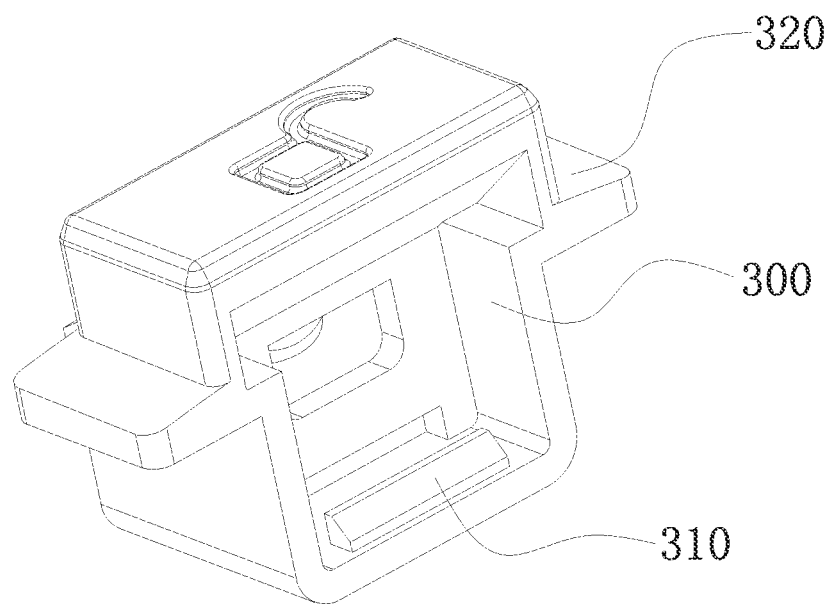
FIG. 7 is a schematic structural diagram of a switch base according to the present invention.

As shown in FIGS. 5 and 7, based on the embodiments described above, the switch base 300 is further provided with a limiting section 320, which is in abutment with an opening of the mounting cavity 113 to confine the switch base 300 within the mounting cavity 113.

In this embodiment, the limiting section 320 is in fact a lug on the switch base 300. The return spring pushes the switch base 300 to move outwards from the mounting cavity 113, and the limiting section 320 is in abutment with the opening of the mounting cavity 113 and clamping the switch base 300 at the opening of the mounting cavity 113, thereby confining the switch base 300 within the mounting cavity 113.

Figure 4:
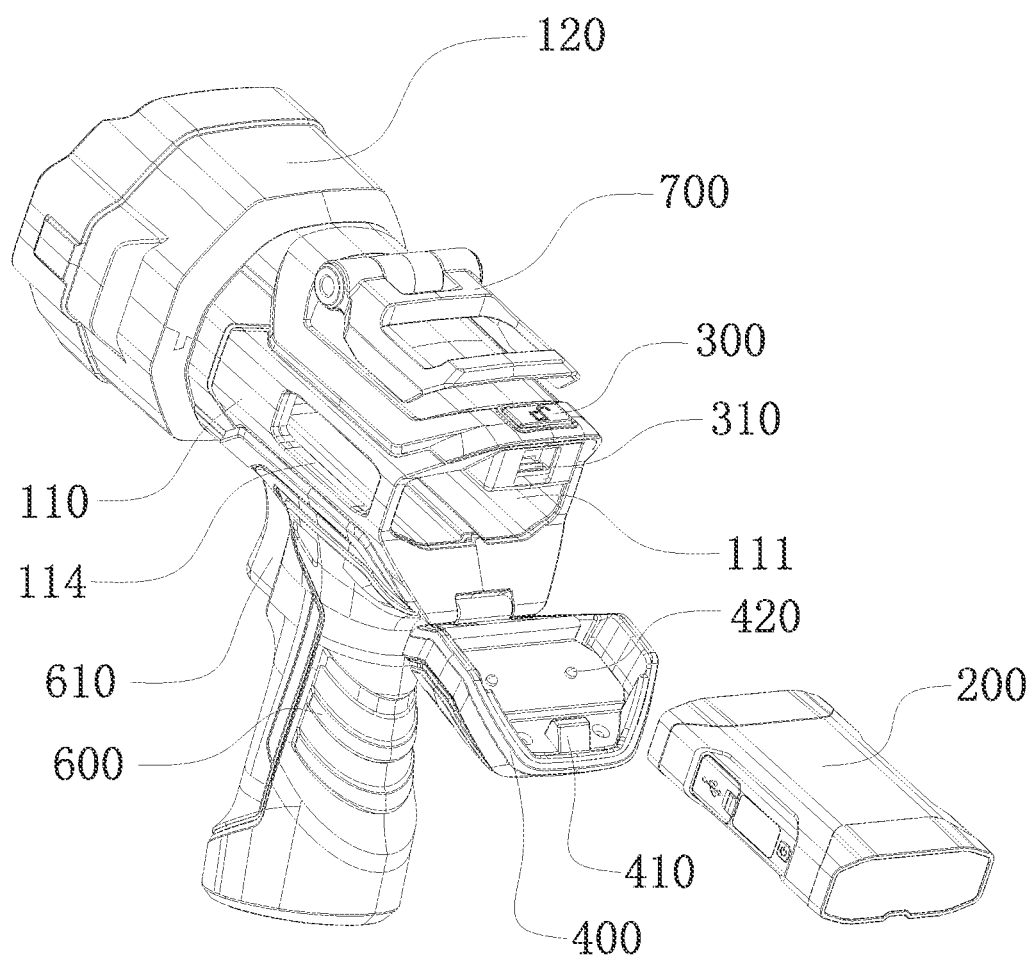
FIG. 4 is a schematic diagram of an opened hand-held spotlight according to the present invention.
Figure 8:
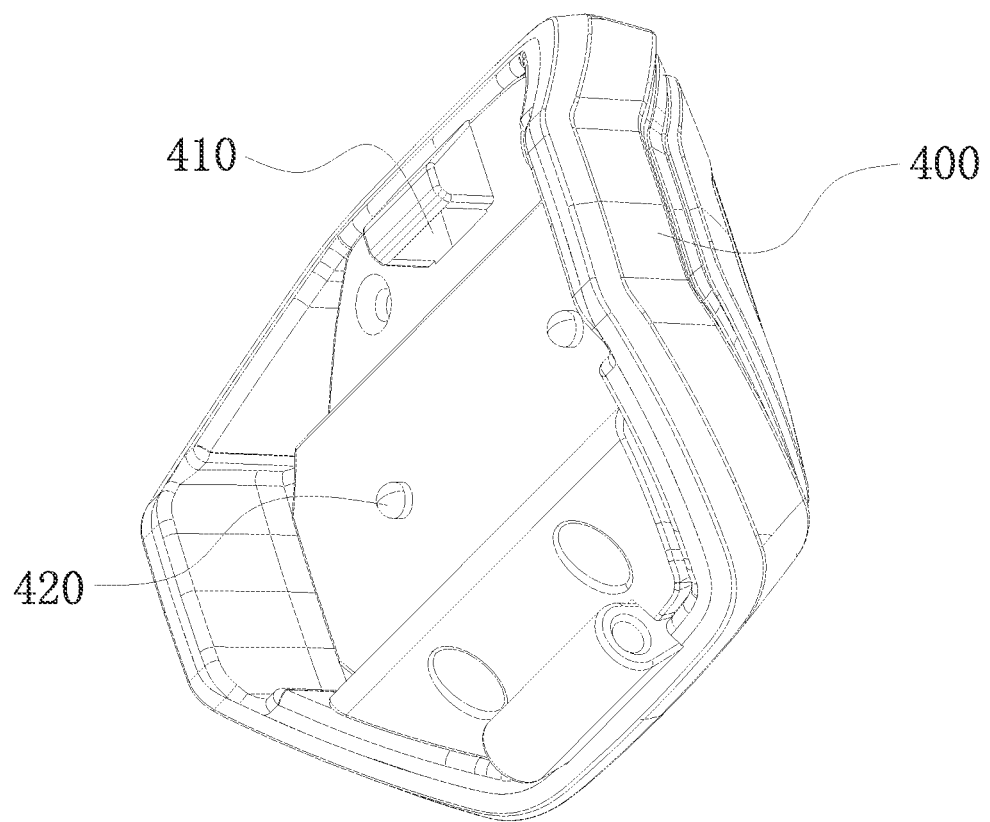
FIG. 8 is a schematic structural diagram of a cover body according to the present invention.

As shown in FIGS. 4 and 8, based on the embodiments described above, the mounting base 110 is provided with a butting column 420, which is in abutment with the power supply box 200 when the cover body 400 covers the opening of the accommodating cavity 111, thereby electrically connecting the first output contact 210 to the receiving contact 112.

In this embodiment, covering with the cover body 400 not only can limit the movement of the power supply box 200, but also can electrically connect the first output contact 210 to the receiving contact 112 by butting and connecting the butting column 420 and the power supply box 200. Therefore, the power can be switched on without manually pressing the power supply box 200, thereby achieving convenience in use.

In practical use, the butting column 420 may be further constructed to be an elastic member, such that the butting column 420 can elastically push the power supply box 200. As a result, it is ensured that the power supply box 200 would not be abraded and deformed due to an excessive acting force from the butting column 420.

As shown in FIG. 2, based on the embodiments described above, the mounting base 110 is further provided with a circuit board 500, which is electrically connected to the power supply box 200; and the circuit board 500 may control the power supply of the power supply box 200.

In this embodiment, the circuit board 500 may be disposed inside the handle 600 and may control the power supply condition of the power supply box 200 to the lighting element 121. When the circuit board 500 controls the power supply box 200 to be disconnected from the lighting element 121, the power supply box 200 stops supplying power to the lighting element 121; and when the circuit board 500 controls the power supply box 200 to be connected with the lighting element 121, the power supply box 200 continues to supply power to the lighting element 121.

As shown in FIGS. 1, 2, and 3, based on the embodiments described above, the hand-held spotlight further includes a handle 600, which is connected to the mounting base 110; and the handle 600 is provided with a trigger button 610, which is connected to the circuit board 500.

In this embodiment, the circuit board 500 is in effect provided with a conductive rubber corresponding to the position of the trigger button 610; and the conductive rubber can be triggered after the trigger button 610 is pressed, thereby controlling the circuit board 500 to send a corresponding signal.

The connection mode between the trigger button 610 and the handle 600 is not specifically defined and may be a hinged connection or a sliding connection. In the case of the hinged connection between the trigger button 610 and the handle 600, the trigger button 610 is of a triggered type; and in the case of the sliding connection between the trigger button 610 and the handle 600, the trigger button 610 is of a pressed type.

As shown in FIGS. 1, 2, and 3, based on the embodiments described above, the light-holder base 120 has a D-shaped light-holder structure.

In this embodiment, the light-holder base 120 is similar to a light holder of a flashlight, and the light-holder base 120 in such a structure may create a more focused irradiation range for lamplight.

Figure 6:
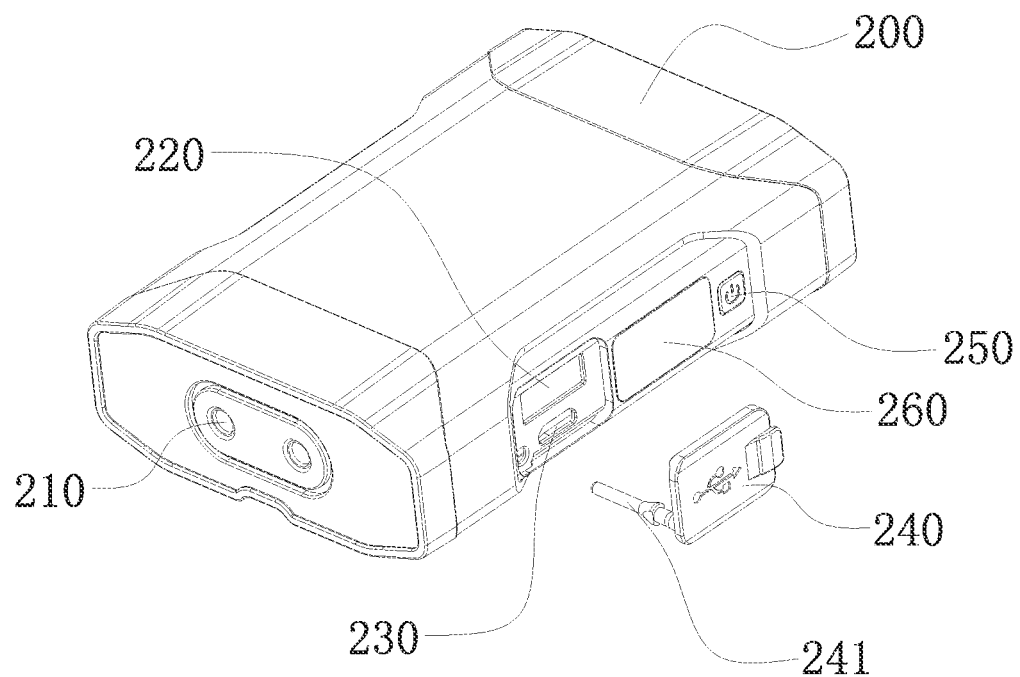
FIG. 6 is a schematic structural diagram of a power supply box according to the present invention.

As shown in FIGS. 1, 4, and 6, based on the embodiments described above, a side wall of the mounting base 110 is provided with a side hole 114, which is connected to the accommodating cavity 111; and the power supply box 200 is further provided with a second output contact 220 and an input contact 230, both of which are located in the side hole 114.

It is worth noting here that the input contact 230 is disposed to charge the power supply box 200; the second output contact 220 is disposed to supply power to an external electric device; the side hole 114 is in effect a through hole in the side wall, and is disposed in such a way that the power supply box 200 can be used as a mobile power pack without detachment, thereby enabling both power supply and charging.

In this embodiment, the second output contact 220 is a USB interface and is disposed to supply power to an external electric device. Therefore, the power supply box 200 can supply power to both the lighting element 121 via the first output contact and to the external electric device via the second output contact.

As shown in FIGS. 1, 4, and 6, based on the embodiments described above, the power supply box 200 is further provided with a detachable cover piece 240, which covers the second output contact 220 and the input contact 230.

In this embodiment, the second output contact 220 and the input contact 230 are exposed to the outside and prone to getting rusty due to moisture. The cover piece 240 is disposed to effectively protect the second output contact 220 and the input contact 230 against dust and moisture and prevent the power supply box 200 from failures caused by the faults of the second output contact 220 and the input contact 230 after long-term storage.

As shown in FIG. 6, based on the embodiments described above, the cover piece 240 is provided with a connecting cord 241, which has one end elastically connected to the cover piece 240 and the other end inserted into the power supply box 200.

In this embodiment, the cover piece 240 is connected to the power supply box 200 through the connecting cord 241. Therefore, when the cover piece 240 is removed, the cover piece 240 connected to the connecting cord 241 is automatically hung next to the power supply box 200, thereby effectively preventing the cover piece 240 from being dropped and lost.

As shown in FIGS. 1, 4, and 6, based on the embodiments described above, the power supply box 200 is further provided with a power switch 250, which is located in the side hole 114.

In this embodiment, the power switch 250 is located in the side hole 114. Therefore, a user can control the operating state of the power supply box 200 by directly inserting a finger into the side hole 114 to press the power switch 250, instead of pressing the power switch 250 after pressing the switch base 300 and taking out the power supply box 200.

As shown in FIGS. 1, 4, and 6, based on the embodiments described above, the power supply box 200 is further provided with a display screen 260 for displaying the remaining capacity of the power supply box 200, and the display screen 260 is located in the side hole 114.

In this embodiment, the display screen 260 is located in the side hole 114, in such a way that a user can conveniently observe the display screen 260 through the side hole 114, thereby learning the remaining capacity of the power supply box 200 timely and charging the power supply box 200 timely.

As shown in FIGS. 1, 3, and 4, based on the embodiments described above, the mounting base 110 is hinged with a lifting handle 700.

In this embodiment, the lifting handle 700 is disposed to facilitate a user. The hand-held spotlight when in use can be lifted with a hand in the case that a user is not available for holding the spotlight or the handle 600 is damaged. Therefore, the hand-held spotlight is more universal.

Further, a torsional spring may be further sleeved at a place where the lifting handle 700 and the mounting base 110 are hinged and both ends of the torsional spring are respectively in abutment with the lifting handle 700 and the mounting base 110. Therefore, the lifting handle 700 when not used is automatically tightly butted against the mounting base 110, thereby achieving a compact structure, and the step of turning back the lifting handle by the user is omitted.

The specific embodiments described herein are merely for exemplifying the spirit of the present invention. Those skilled in the art to which the present invention belongs may make a variety of modifications or supplementations or substitutions in a similar way to the specific embodiments as described, which is deemed as not departing from the spirit of the present invention or not going beyond the scope defined by the accompanying claims.

What is claimed is:

1. A hand-held spotlight, comprising:
a housing provided with an accommodating cavity;
a power supply box detachably disposed in the accommodating cavity;
a switch base connected to the housing and provided with a first clamping block; and
a cover body hinged with the housing, wherein the cover body is capable of covering an opening of the accommodating cavity to confine the power supply box within the accommodating cavity, and the cover body is provided with a second clamping block, which is clamped with the first clamping block when the cover body covers the opening of the accommodating cavity, thereby restricting the flipping of the cover body;
the housing comprises a mounting base and a light-holder base connected to the mounting base; the accommodating cavity is located in the mounting base; the power supply box is provided with a first output contact; the light-holder base is provided with a lighting element; the accommodating cavity is provided with a receiving contact, which is electrically connected to the lighting element; and the first output contact is electrically connected to the receiving contact to allow the power supply box to supply power to the lighting element;

the mounting base is provided with a mounting cavity, in which the switch base is movably disposed, and the switch base when pressed towards the mounting cavity is capable of separating the first clamping block from the second clamping block;

the mounting cavity is internally provided with a reset spring, both ends of which are respectively in abutment with the switch base and the bottom surface of the mounting cavity;

the switch base is further provided with a limiting section, which is in abutment with an opening of the mounting cavity to confine the switch base within the mounting cavity.

2. The hand-held spotlight according to claim 1, wherein the mounting base is provided with a butting column, which is in abutment with the power supply box when the cover body covers the opening of the accommodating cavity, thereby electrically connecting the first output contact to the receiving contact.

3. The hand-held spotlight according to claim 2, wherein the mounting base is further provided with a circuit board, which is electrically connected to the power supply box; and the circuit board is capable of controlling the power supply of the power supply box.

4. The hand-held spotlight according to claim 3, further comprising a handle, which is connected to the mounting base, wherein the handle is provided with a trigger button which is connected to the circuit board.

5. The hand-held spotlight according to claim 1, wherein the light-holder base has a D-shaped light-holder structure.

6. The hand-held spotlight according to claim 1, wherein a side wall of the mounting base is provided with a side hole, which is connected to the accommodating cavity; and the power supply box is further provided with a second output contact and an input contact, both of which are located in the side hole.

7. The hand-held spotlight according to claim 6, wherein the power supply box is further provided with a detachable cover piece, which covers the second output contact and the input contact.

8. The hand-held spotlight according to claim 7, wherein the cover piece is provided with a connecting cord, which has one end elastically connected to the cover piece and the other end inserted into the power supply box.

9. The hand-held spotlight according to claim 6, wherein the power supply box is further provided with a power switch, which is located in the side hole.

10. The hand-held spotlight according to claim 9, wherein the power supply box is further provided with a display screen for displaying the remaining capacity of the power supply box, and the display screen is located in the side hole.

11. The hand-held spotlight according to claim 1, wherein the mounting base is hinged with a lifting handle.

* * * * *